United States Patent

Kiesel

[11] Patent Number: 6,065,438
[45] Date of Patent: May 23, 2000

[54] CONTINUOUS PISTON RINGS FOR AN INTERNAL COMBUSTION ENGINE

[75] Inventor: Mark J. Kiesel, Peoria, Ill.

[73] Assignee: Caterpillar Inc., Peoria, Ill.

[21] Appl. No.: 08/997,421

[22] Filed: Dec. 23, 1997

[51] Int. Cl.[7] .................................................. F16J 9/20
[52] U.S. Cl. ....................................... 123/193.6; 277/438
[58] Field of Search ......................... 123/193.6; 277/434, 277/438, 458, 459, 491, 436, 439

[56] References Cited

U.S. PATENT DOCUMENTS

| | | | |
|---|---|---|---|
| 2,107,241 | 2/1938 | Freer | 277/438 |
| 2,867,482 | 1/1959 | Schmidt | 277/438 |
| 3,563,558 | 2/1971 | Doutt | 277/438 |
| 4,794,848 | 1/1989 | Melchior . | |
| 5,253,877 | 10/1993 | Debiasse et al. | 277/491 |
| 5,398,945 | 3/1995 | Hinshaw et al. . | |

FOREIGN PATENT DOCUMENTS 2702024   2/1994   France .

*Primary Examiner*—Marguerite McMahon
*Attorney, Agent, or Firm*—Haverstock, Garrett and Roberts; Maginot, Addison & Moore

[57] ABSTRACT

A continuous compression ring and a continuous oil control ring for a piston reciprocally operable in a combustion cylinder of an IC engine, the continuous compression ring being cooperatively receivable in a groove extending around the piston and having a generally G-shaped cross-sectional shape including a circumferentially extending lip positioned to be located radially outwardly of a cylindrical outer surface extending around the piston, the lip adapted for forming a substantially sealed condition around the piston in cooperation with an oil film on the combustion cylinder wall, the continuous oil control ring being cooperatively receivable in another groove extending around the piston and having a generally n-shaped cross-sectional shape including a circumferentially extending leg portion adapted to be positioned radially outwardly of the outer surface of the piston around the piston for scraping the oil film on the combustion cylinder wall during the reciprocal operation of the piston in the combustion cylinder, and a piston construction adapted to facilitate installation of the continuous compression ring and continuous oil control ring around the piston.

11 Claims, 3 Drawing Sheets

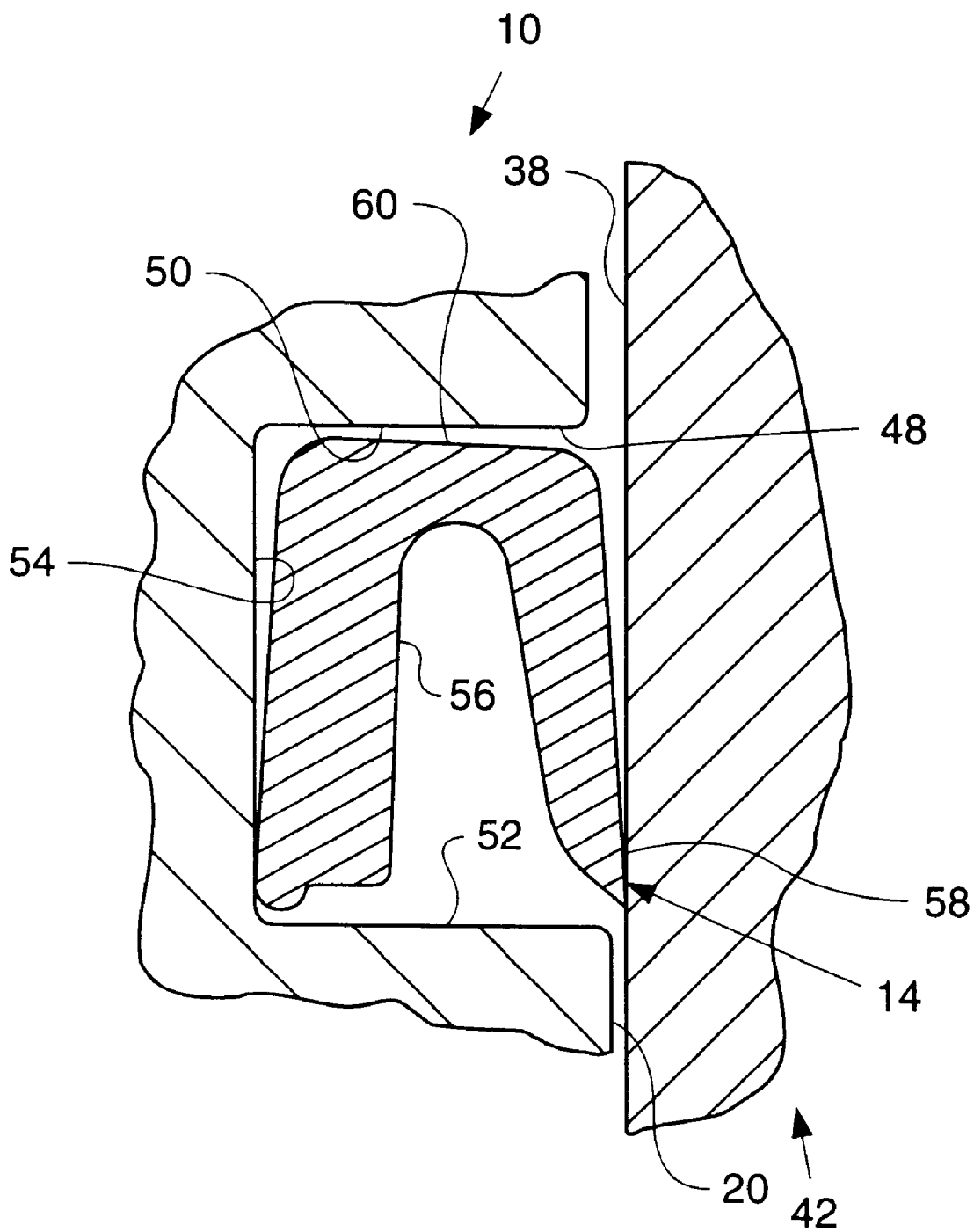

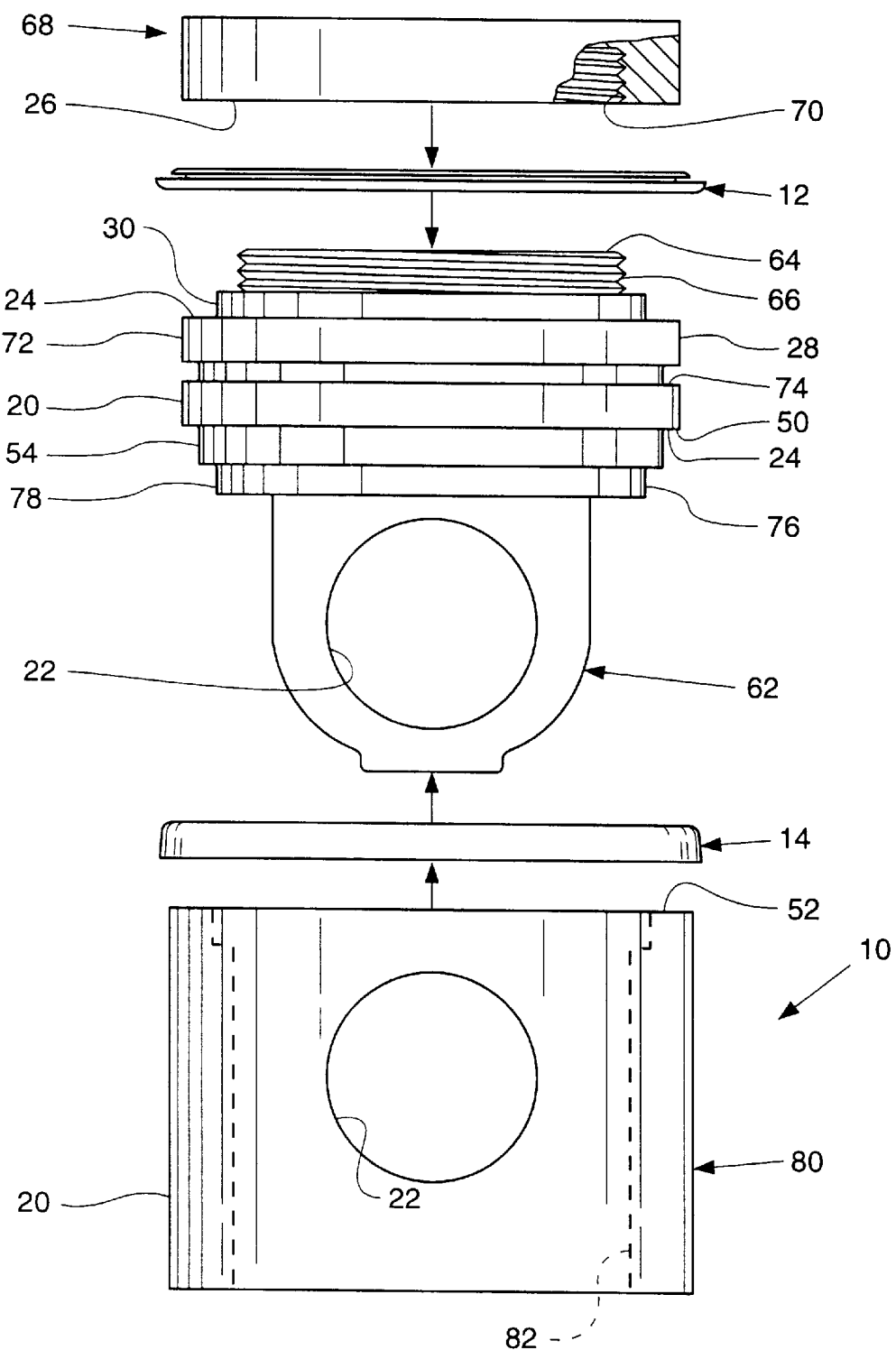

CONTINUOUS PISTON RINGS FOR AN INTERNAL COMBUSTION ENGINE

TECHNICAL FIELD

This invention relates generally to rings for performing sealing and oil scraping functions around pistons reciprocally operable in combustion cylinders of internal combustion (IC) engines, and, more particularly, to circumferentially continuous compression rings and oil scraper rings for pistons of IC engines.

BACKGROUND ART

Currently, at least three (3) types of rings are typically utilized to perform the required sealing and oil scraping functions associated with the reciprocal operation of a piston in a combustion cylinder of an IC engine. These three types of piston rings are often respectively referred to as the compression ring, typically located adjacent the end of a piston closest to the combustion chamber; the oil control ring, typically located adjacent to the end of a piston closest to the crank case; and one or more intermediate rings, typically located at one or more intermediate positions between the compression and oil control rings. In operation, the compression ring serves to form at least a partially sealed condition around the piston in cooperation with an oil film present on the cylinder wall, for maintaining a pressure differential condition between the combustion chamber and the crank case during the reciprocal movement of the piston in the combustion cylinder. This is most important during the compression stroke and power stroke of the piston when the combustion chamber is highly pressurized relative to the crank case. The oil control ring serves to scrape or wipe oil present on the cylinder wall to more uniformly distribute the oil and maintain an even oil film on the wall for lubrication and sealing purposes, mostly during the intake and power strokes of the piston when it is moving towards the crank case, the oil control ring floating or gliding over the oil film on the cylinder wall during the compression and exhaust strokes when the piston is moving in the opposite direction. The intermediate ring or rings typically supplement the sealing and oil scraping functions of the compression ring and oil control ring.

Importantly, the compression, intermediate, and oil control rings are typically of a gapped or split construction, that is, they are not circumferentially continuous. One advantage of this construction is that it facilitates passage of the rings over the outer surface of the piston to allow installation of the rings in circumferentially extending grooves in the outer surface. However, the gapped or split construction of the rings also contributes to at least two well known problems. One problem is known as "blowby" which is characterized by the escape of pressurized combustion gases from the combustion chamber past the piston rings to the crank case and beyond. Blowby is believed to occur mostly through the gaps or splits in the piston rings or between the ring and groove and is a contributing cause of combustion chamber compression and efficiency losses, crank case oil contamination, and pollution output. The second problem is the leakage of crank case oil in the opposite direction through the gaps or splits in the rings to the combustion chamber, which leakage has been found to result in increased oil consumption, particulate emissions and deposits which cause pollution and other problems.

Known alternatives to gapped and split piston rings include a variety of circumferentially continuous piston ring constructions, and constructions having abutting and/or interlocking circumferential end portions, all of which alternative constructions have been observed to achieve only limited improvements with regard to the above-discussed problems. See, for instance, Melchior, U.S. Pat. No. 4,794,848, issued Jan. 3, 1989; Hinshaw et al. U.S. Pat. No. 5,398,945, issued Mar. 21, 1995; and Martial, FR 2 702 024.

Accordingly, the present invention is directed to overcoming one or more of the problems as set forth above.

DISCLOSURE OF THE INVENTION

In one aspect of the present invention a continuous compression ring for a piston reciprocally operable in a combustion cylinder of an IC engine is disclosed, the piston having a cylindrical outer surface portion extending therearound including a circumferentially extending groove therein and an end portion adapted for connection to a connecting rod of the engine, the compression ring comprising a continuous annular member cooperatively receivable in the circumferential groove around the piston and having a generally G-shaped cross-sectional shape, including a circumferentially extending end portion which forms a circumferential lip adapted to be positioned radially outwardly of the cylindrical outer surface around the piston for forming a substantially sealed condition therearound in cooperation with an oil film on the cylinder wall as the piston assembly moves reciprocally in the cylinder, the sealed condition serving to maintain any pressure differential condition present between the combustion chamber and the crank case and substantially reducing the occurrence of blowby. According to a preferred aspect of the invention, the generally G-shaped cross-sectional shape of the compression ring defines an annular cavity having a circumferential opening in communication with the combustion chamber such that elevated pressure conditions in the combustion chamber are communicated to the cavity and serve to urge the in-turned end portion and lip of the compression ring radially outwardly to uniformly increase the sealed condition around the piston during the compression and power strokes.

According to another aspect of the invention, a continuous annular oil control ring is cooperatively receivable in a groove extending circumferentially around the piston at a location closer to the end portion thereof for connection to a connecting rod of the engine. The preferred oil control ring has a generally n-shaped cross-sectional shape including a leg portion adapted to be positioned radially outwardly of the cylindrical outer surface of the piston, which leg portion is operable for wiping or scraping the oil film on the cylinder wall around the piston during the intake and power strokes and floating or gliding over the oil film on the compression and exhaust strokes.

According to another preferred aspect of the present invention, a piston assembly adapted for use with the present continuous compression ring and oil scraper ring is disclosed which includes a piston body having a first end portion adapted for cooperatively receiving a separate piston crown that forms a portion of the compression ring groove to facilitate installation of the compression ring in the groove, and a second end portion adapted for cooperatively receiving a separate piston skirt defining a portion of the oil control ring groove to facilitate installation of the oil control ring in that groove, the piston crown and skirt being attachable to the piston body using any suitable means, including, but not limited to, threaded attachment, mechanical attachment, and frictional attachment, the skirt being most preferably securable to the piston body with a conventional wrist pin used for attachment of the piston assembly to the connecting rod.

According to several additional aspects of the present invention, the continuous compression ring can be made from a resiliently biasable material, such as a spring steel or other suitable metallic or non-metallic material, such that the circumferentially extending end portion and lip thereof are biasable against the oil film, and the compression ring can be dimensioned to be snugly press fit around the piston body or other member that forms the first groove so as to form a substantially sealed condition between the piston body or other member and the compression ring to prevent blowby and other leakage therethrough. Likewise, the oil control ring can be made from a resiliently biasable material such as a spring steel or other metallic or non-metallic materials, or high performance plastic materials, so as to also be biasable against the oil film, and can be tightly or press fit around the piston body or otherwise cooperatively engaged therewith to form a substantially sealed condition therebetween to limit or prevent oil leakage.

BRIEF DESCRIPTION OF DRAWINGS

For a better understanding of the present invention, reference may be made to the accompanying drawings in which:

FIG. 3 is a diagrammatic fragmentary cross-sectional view of the piston assembly and oil control ring of FIG. 1 in association with the combustion cylinder wall of FIG. 2, showing the operational position of the oil control ring for scraping an oil film (not shown) on the wall; and FIG. 4 is an exploded diagrammatic view of the piston assembly of FIG. 1, showing installation of the compression and oil control rings and a separate piston crown and skirt of the assembly.

BEST MODE FOR CARRYING OUT THE INVENTION

Figure 1:
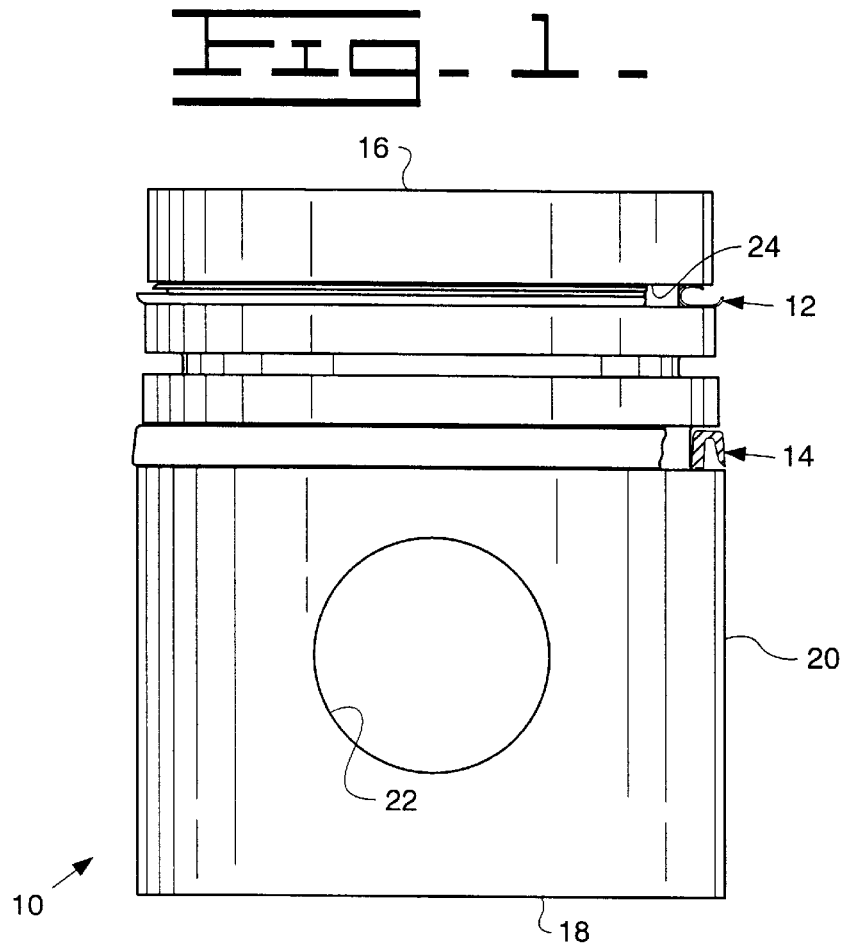
FIG. 1 is a diagrammatic side view of a piston assembly including a continuous compression ring and a continuous oil control ring according to the present invention, showing the rings in partial cross-section.

Referring now to the drawings, wherein a preferred embodiment of the present invention is shown, FIG. 1 identifies a piston assembly 10 including a continuous compression ring 12 and a continuous oil control ring 14 constructed and operable in accordance with the teachings of the present invention. Piston assembly 10 is a generally cylindrical shaped structure having a free end portion 16, an opposite second end portion 18, and a cylindrical outer surface portion 20 extending therebetween. Piston assembly 10 is adapted for reciprocal operation in a combustion cylinder of an IC engine (not shown) in the conventional manner with free end portion 16 of the piston assembly located in communication with a combustion chamber located at one end of the combustion cylinder, opposite second end portion 18 located in communication with the engine crank case at the opposite end of the combustion cylinder, and cylindrical outer surface portion 20 located in closely spaced relation to a wall or surface of an engine block or other member forming the combustion cylinder, the outer surface portion 20 having a diametrical dimension correspondingly smaller than that of the wall or surface cylinder in general accordance with standard piston sizing practices. Second end portion 18 of piston assembly 10 additionally includes conventional means for pivotal attachment to a connecting rod of an engine, including a transversely extending hole 22 therethrough adapted for cooperatively receiving a wrist pin in the conventional manner (also not shown).

Figure 2:
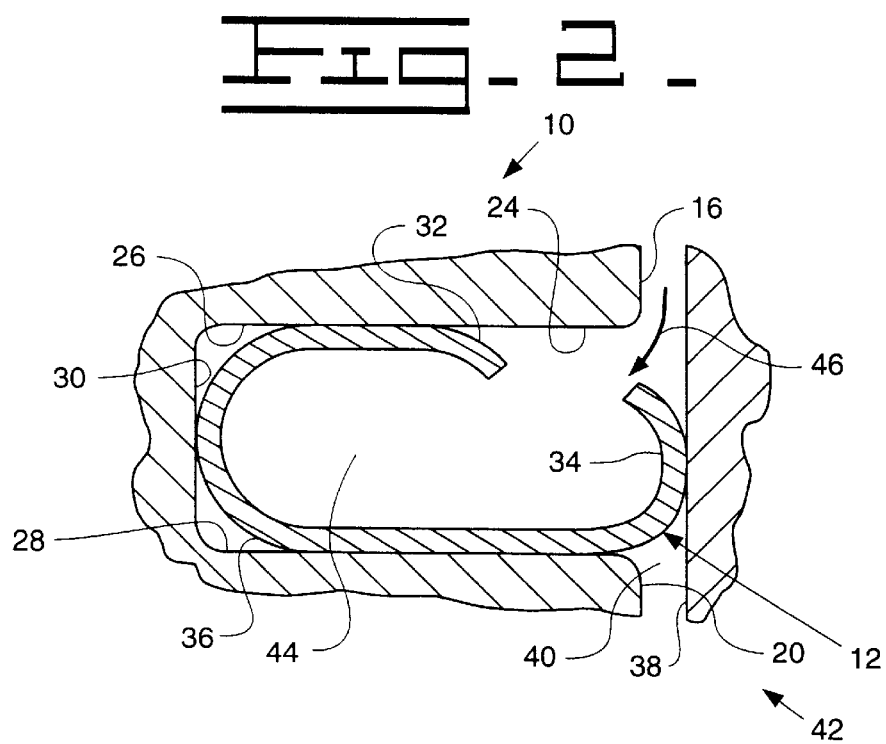
FIG. 2 is a diagrammatic fragmentary cross-sectional view of the piston assembly and continuous compression ring of FIG. 1, showing the operational position of the compression ring with respect to a wall of a combustion cylinder of a typical IC engine, also shown in fragmentary cross-section, for forming a sealed condition around the piston assembly.

Referring also to FIG. 2, continuous compression ring 12 is located in a compression ring groove 24 extending around cylindrical outer surface portion 20 of the piston assembly 10 adjacent free end portion 16. Compression ring groove 24 is formed by opposed axially facing annular surface portions 26 and 28, and a recessed radially outwardly facing annular surface portion 30. Continuous compression ring 12 is an annular member having a generally G-shaped cross-sectional shape including a generally radially outwardly extending end portion 32, an opposite radially in-turned end portion which forms a circumferentially extending lip 34 located radially outwardly of end portion 32, and a generally arcuate shaped intermediate portion 36 extending between end portions 32 and 34. Compression ring 12 is preferably made from a resiliently biasable material such as a spring steel and has a diametrical dimension as measured across the diametrically opposed radial outermost portions of circumferential lip 34 which is larger than that of cylindrical outer surface portion 20 so as to extend radially outwardly from groove 24 and surface portion 20 an approximate predetermined amount sufficient such that the lip 34 will be positioned to form a substantially sealed condition around the piston assembly in cooperation with an oil film (not shown) present on a cylinder wall of an engine block or other member defining a combustion cylinder in which piston assembly 10 is reciprocally movable, such as cylinder wall 38 of engine block 42 defining combustion cylinder 40 shown in FIG. 2, while still allowing generally free reciprocal movement of the piston assembly in the cylinder.

Importantly, during the reciprocal operation of the assembly 10 in a combustion cylinder of an engine such as the cylinder 40, elevated pressure conditions will be periodically present in the combustion chamber (not shown) adjacent free end portion 16 of the piston assembly as a result of combustion conditions in the chamber. These pressurized conditions are communicated through that portion of cylinder 40 between cylindrical outer surface portion 20 of the free end 16 of the piston assembly and the cylinder wall 38 through a circumferentially extending opening which is a part of an annular cavity 44 formed by compression ring 12, as shown by the arrow 46. There, the elevated pressure conditions are operable to bias the radially in-turned end portion including circumferentially extending lip 34 of compression ring 12 radially outwardly towards cylinder wall 38, to thereby increase the sealed condition around the piston assembly, so as to reduce the occurrence of blowby and the problems associated therewith discussed above. Conversely, when such elevated pressure conditions are not present in the combustion chamber, in-turned end portion and lip 34 of the compression ring is not correspondingly biased radially outwardly by the compression pressure, thereby facilitating easier movement of the piston assembly in the cylinder and improved economy.

Turning to FIG. 3, continuous oil control ring 14 is located in an annular oil control ring groove 48 extending around piston assembly 10, which groove 48 is formed by opposed axially facing surface portions 50 and 52 and a recessed radially outwardly facing surface portion 54 extending therebetween. Oil control ring 14 is a continuous annular member having an n-shaped cross-sectional shape including a radially inwardly located generally axially extending leg 56, a radially outwardly located generally axially extending leg 58, and a generally arcuate shaped intermediate portion 60 extending therebetween. Oil control ring 14 has an outer diametrical dimension as measured across the diametrically opposed radial portions of outermost leg 58 which is greater than that of the cylindrical outer surface portion 20 of piston assembly 10, such that leg 58 extends radially outwardly from groove 48 and surface 20 a desired approximate predetermined amount and contacts the oil film (again, not shown) on cylinder wall 38 around the piston assembly. Oil control ring 14 is preferably made from a resiliently biasable material, such as a spring steel or an engineered plastic material, and is sufficiently large diametrically so that leg 58 is biased at least somewhat against the oil film on cylinder wall 38. In operation, this, in combination with the orientation of the n-shaped cross-section of the ring, enables oil control ring 14 to wipe or scrape oil from the cylinder wall on the intake and power strokes, and glide over the oil film on the compression and exhaust strokes. Additionally, and importantly, since the oil control ring 14 extends continuously around piston assembly 10, no gap or split is present for the leakage of oil past the ring, thereby enabling ring 14 to effectively reduce oil leakage and consumption compared to gapped and split rings.

Referring to FIG. 4, the components of the preferred embodiment of piston assembly 10 are shown. The preferred piston assembly 10 includes a generally cylindrical shaped piston body portion 62 having a first end portion 64 including an outer threaded portion 66 adapted for threadedly receiving a piston crown 68 having an internally threaded portion 70. Piston crown 68 also includes axially facing surface 26 which forms part of compression ring groove 24. Piston body portion 62 includes radially outwardly facing surface portion 30 and axially facing surface portion 28 which form the remainder of compression ring groove 24, such that when threadedly engaged, piston body portion 62 and piston crown 68 form the groove 24. Continuous compression ring 12 is installable in groove 24 around radially outwardly facing surface portion 30 by passage over outer threaded portion 66 as shown by the arrow therebetween prior to installation of the piston crown on the piston body. Here, it should be noted that often it is desirable for a sealed condition to exist between compression ring 12 and one or more surfaces forming groove 24 to substantially limit or prevent passage of combustion gases and oil leakage around the radial inner periphery of compression ring 12. It is contemplated that this can be accomplished in a number of ways, one preferred alternative including making the diametrical dimension across the radially innermost portions of compression ring 12 sufficiently small so as to require the ring to be pressed or otherwise snugly or tightly fitted around surface portion 30. As another alternative, piston crown 68 can be mountable to piston body portion 62 so as to controllably compress the compression ring between surfaces 26 and 28 thereby forming a sealed condition with one or both of those surfaces.

Piston body portion 62 additionally has an intermediate portion 72 including a large portion of cylindrical outer surface portion 20, as well as one or more optional intermediate ring grooves, such as the groove 74 shown, for cooperatively receiving a corresponding number of intermediate rings (not shown). Piston body portion 62 further has a second end portion 76 located opposite first end portion 64, which end poriton 76 includes axially facing surface portion 50 and radially outwardly facing surface portion 54 which form part of oil control ring groove 48 (FIG. 3). Similar to compression ring 12, oil control ring 14 has a radial innermost diametrical dimension corresponding to or optionally slightly smaller than that of outer surface portion 54, such that oil control ring 14 can be installed over end portion 76 and press or snugly fit onto surface 54 to form a sealed condition to substantially limit or prevent oil leakage around the inner periphery of the ring. Second end portion 76 further includes a cylindrical shaped outer surface portion 78 which is smaller diametrically than surface 54 and is adapted for cooperatively receiving a piston skirt 80, skirt 80 having an inner cylindrical surface 82 adapted for that purpose. Second end portion 76 and skirt 80 further each include a transversely extending hole 22 therethrough adapted for cooperatively receiving a connecting rod wrist pin (not shown) as discussed above in the conventional manner for securing piston assembly 10 and connecting rod, and also securing skirt 80 to piston body 62.

Here, it should be recognized that it is contemplated that piston assembly 10 can be made from a wide variety of materials utilized for making pistons for IC engines, including, but not limited to aluminum alloys. It should also be recognized that a wide variety of means can be utilized for the attachment of piston skirt 80 to piston body 62 in addition to those herein described above, with equal utility. Further, it should be understood that piston skirt 80 can be optionally made from alternative materials, such as plastic materials. Also, it should be recognized that it is contemplated that the respective "G" and "n" shaped cross-sectional shapes of compression ring 12 and oil control ring 14, as well as the cross-sectional dimensions thereof, are not to be limited to those exact constructions shown in FIGS. 1–4, and that the general shapes and dimensions of the rings can be varied widely to accommodate the requirements of different engine applications. As an example, while circumferential lip 34 of compression ring 12 is shown and described as being formed by a radially in-turned end portion, it could likewise be formed by a bulbous or rounded circumferentially extending member, to illustrate just one alternative.

INDUSTRIAL APPLICABILITY

The present continuous piston rings and piston assembly disclosed herein above have utility in a wide variety of IC engine applications, including engines for vehicular, commercial, and industrial uses, and provide the benefits of improved efficiency and lower oil consumption and pollution, compared to engines utilizing pistons with split or gapped rings. Other aspects, objects and advantages of the present invention can be obtained from a study of the drawings, the disclosure and the appended claims.

What is claimed is:

1. A continuous compression ring for a piston reciprocally operable in a combustion cylinder of an IC engine, the piston having a cylindrical outer surface portion extending therearound including a circumferentially extending piston groove therein and an end portion adapted for connection to a connecting rod of the engine, the continuous compression ring comprising:

a continuous annular member cooperatively receivable in the circumferentially extending piston groove, the continuous annular member having a generally G-shaped cross-sectional shape including an in-turned end portion which forms a circumferentially extending lip positioned to be located radially outwardly of the cylindrical outer surface portion around the piston when the annular member is cooperatively received in the circumferentially extending piston groove, the circumferentially extending lip being adapted for forming a substantially sealed condition around the piston in cooperation with an oil film on a wall defining the combustion cylinder when the piston is positioned for reciprocal operation therein.

2. A continuous compression ring, as set forth in claim 1, wherein the annular member further comprises an annular cavity including a circumferential opening positioned and adapted for receiving pressurized combustion gases from a combustion chamber of the combustion cylinder when the annular member is received in the circumferentially extending piston groove and the piston is operably positioned in the combustion cylinder, and wherein the circumferentially extending lip is adapted to be biasable radially outwardly by the pressurized combustion gases to increase the sealed condition formed by the circumferentially extending lip.

3. A continuous compression ring, as set forth in claim 1, wherein the annular member is adapted to be press fit in the circumferentially extending piston groove in the cylindrical outer surface portion of the piston.

4. A continuous compression ring, as set forth in claim 1, wherein the annular member is comprised of a resiliently biasable spring steel material.

5. A continuous compression ring, as set forth in claim 1, wherein the circumferentially extending piston groove of the piston is formed in part by a separate piston crown attachable to the piston, and wherein the continuous compression ring is cooperatively receivable in the circumferentially extending piston groove prior to attachment of the piston crown to the piston.

6. A piston adapted for reciprocal movement in a combustion cylinder of an IC engine, the piston comprising:

a piston body having a cylindrical outer surface portion extending therearound including a circumferentially extending piston groove therein and an end portion adapted for connection to a connecting rod of the engine; and a continuous annular compression ring located in the circumferentially extending piston groove, the compression ring having a generally G-shaped cross-sectional shape including an in-turned end portion which forms a circumferentially extending lip located radially outwardly of the cylindrical outer surface portion around the piston body, the circumferentially extending lip being adapted for forming a substantially sealed condition around the piston body in cooperation with an oil film on a wall defining the combustion cylinder when the piston is positioned for reciprocal operation therein.

7. A piston, as set forth in claim 6, wherein the circumferentially extending piston groove of the piston body is formed in part by a separate piston crown attachable to the piston body and the continuous compression ring is cooperatively receivable in the circumferentially extending piston groove prior to attachment of the piston crown to the piston body.

8. A piston, as set forth in claim 6, wherein the compression ring is adapted to be press fit in the circumferentially extending piston groove in the cylindrical outer surface portion of the piston body.

9. A piston, as set forth in claim 6, wherein the cylindrical outer surface portion includes at least a second circumferentially extending piston groove therein located closer than the first named circumferentially extending piston groove to the end portion adapted for connection to a connecting rod of the engine, the second circumferentially extending piston groove containing a continuous annular oil control ring adapted for scraping the oil film on the cylinder wall surface as the piston moves in at least one direction in the combustion cylinder.

10. A piston, as set forth in claim 9, wherein the oil control ring has an n-shaped cross-sectional shape including a circumferentially extending leg portion positioned radially outwardly of the cylindrical outer surface of the piston body in position for scraping the oil film.

11. A piston, as set forth in claim 6, wherein the compression ring is comprised of a resiliently biasable spring steel material.

\* \* \* \* \*